United States Patent [19]
Williams

[11] Patent Number: 4,471,448
[45] Date of Patent: Sep. 11, 1984

[54] METHOD AND APPARATUS FOR ALIGNING AN OPTICAL SYSTEM

[75] Inventor: Samuel G. L. Williams, Los Angeles, Calif.

[73] Assignee: Hughes Aircraft Company, El Segundo, Calif.

[21] Appl. No.: 300,073

[22] Filed: Sep. 8, 1981

[51] Int. Cl.³ .................... G05B 13/04; G01N 21/00
[52] U.S. Cl. ................................... 364/525; 364/151; 364/551; 364/559; 356/138; 356/392
[58] Field of Search .............. 364/525, 550, 551, 559, 364/578, 149, 150, 151; 250/201; 350/486; 356/141, 127, 138, 152, 392

[56] References Cited
U.S. PATENT DOCUMENTS

| | | | |
|---|---|---|---|
| 3,896,304 | 7/1975 | Aoki et al. | 250/201 |
| 4,092,716 | 5/1978 | Berg et al. | 364/150 X |
| 4,326,800 | 4/1982 | Fitts | 250/201 X |

Primary Examiner—Edward J. Wise
Assistant Examiner—Kevin J. Teska
Attorney, Agent, or Firm—Mark J. Meltzer; A. W. Karambelas

[57] ABSTRACT

A complex optical system may be aligned by means of a technique in which an analytical model of the system is utilized which is assumed to be capable of essentially optimal performance. A physical example of the same system design is then assembled and a plurality of performance characteristics measured. A plurality of specific adjustments are then calculated which would have the effect of degrading the performance of the analytical model to equal that measured for the physical example, whereupon compensating physical adjustments are made to the physical example. For many applications, the performance measurements may relate to aberrations to the wavefront of the point source image quantified by means of a Hartmann mask or the like. In that event, the estimation technique may be a straight-forward linear approximation technique including possible damping and/or weighting factors. The performance measurements may also be related to the intensity function associated with the image of a point source, in which case a second order estimation technique is required.

30 Claims, 17 Drawing Figures

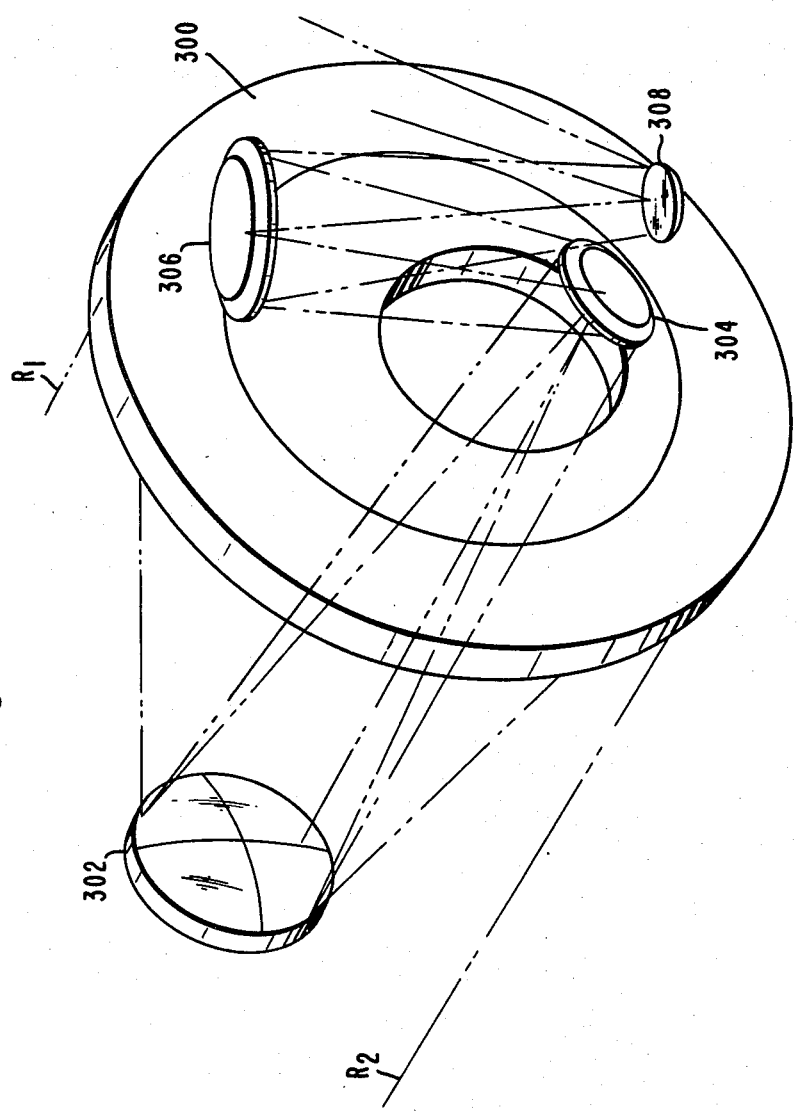

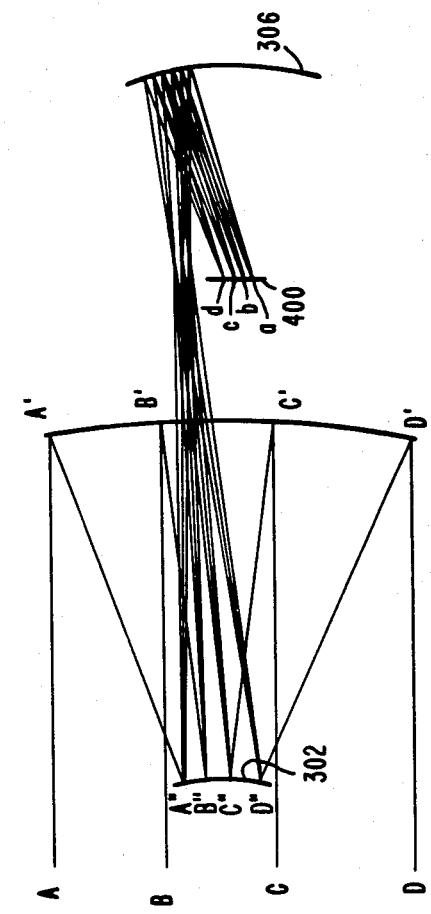
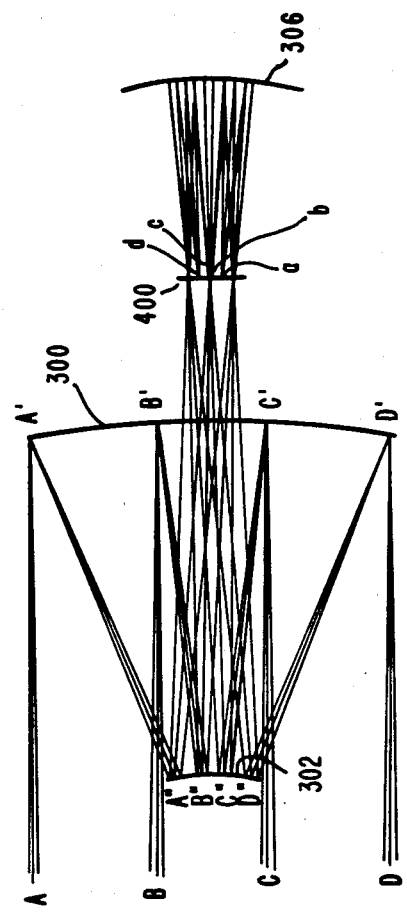
Fig. 4a.
Fig. 4b.

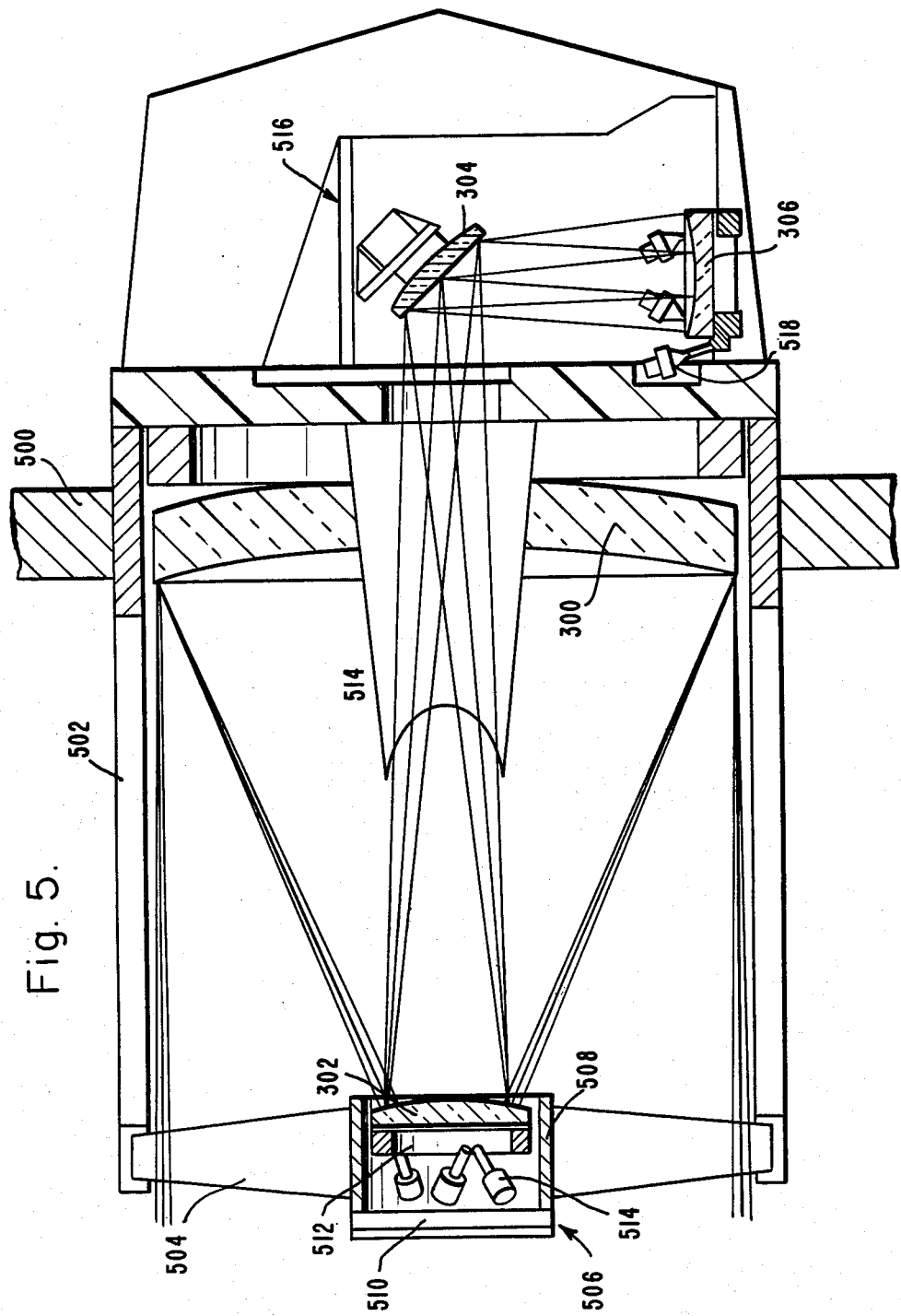

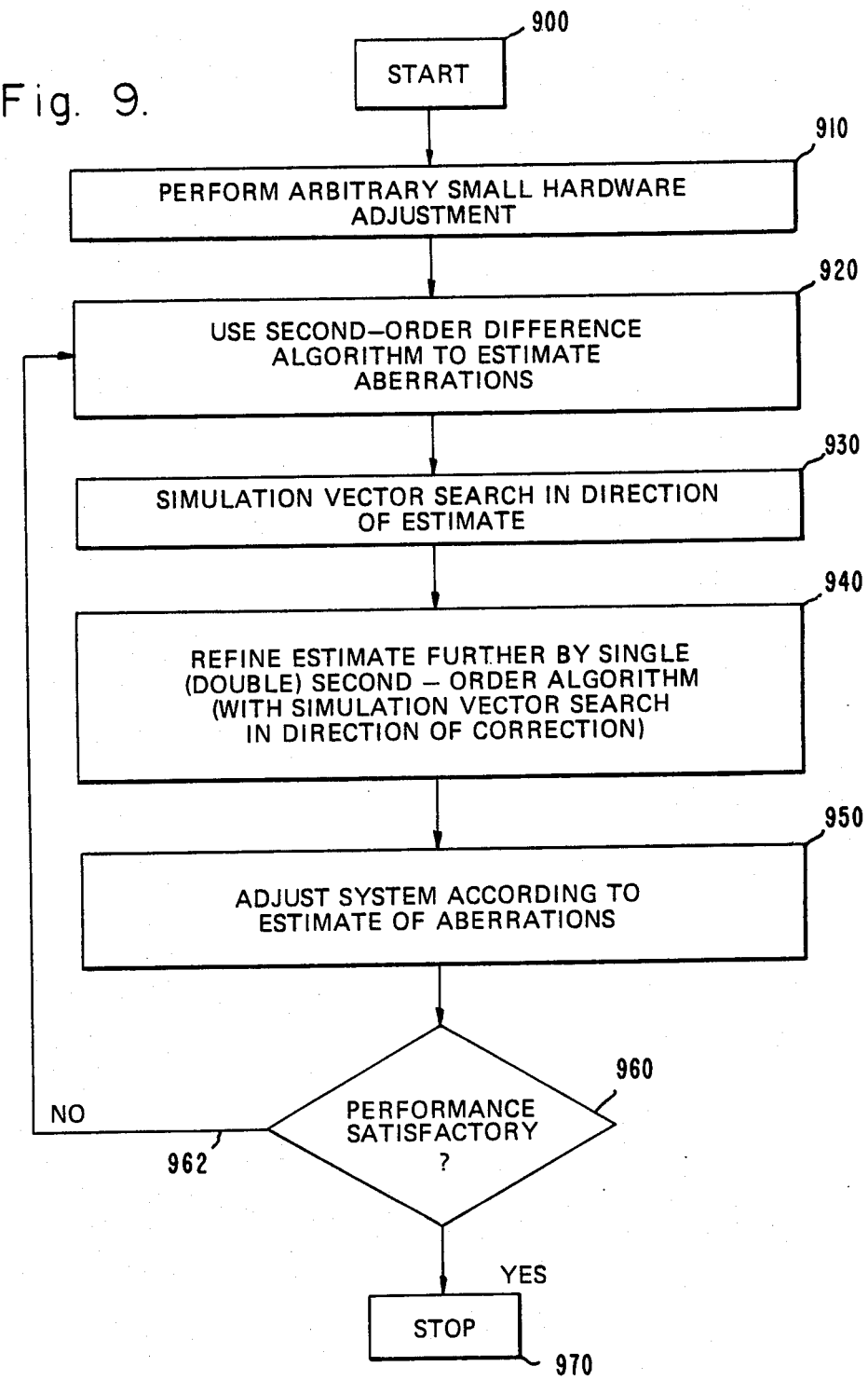

METHOD AND APPARATUS FOR ALIGNING AN OPTICAL SYSTEM

CONTRACTUAL REQUIREMENT

The Government of the United States of America has rights in this invention pursuant to Contract No. F04701-76-C-0159 awarded by the Department of Defense.

TECHNICAL FIELD

The present invention relates generally to optical systems having a plurality of optical elements and more particularly to apparatus and methods for aligning such individual elements with respect to one another.

CROSS-REFERENCE TO RELATED APPLICATIONS

Commonly assigned co-pending application entitled "Method for Aligning an Optical System Utilizing Focal Plane Image Intensity Data", Ser. No. 300,072, Samuel G. L. Williams, Brent E. Ellerbroek, and Ning Wu, Inventors, is directed to a related invention which is based in part on certain generic aspects of the present invention and which, for certain applications, may constitute a preferred embodiment of the present invention.

BACKGROUND OF THE INVENTION

1. Field of the Invention:

Multi-element optical systems continue to find utility in a variety of applications. By constructing the optical system from a plurality of individual optical elements, it is possible to achieve a higher level of performance (sharpness of image, freedom from distortion, brightness, resolving power, and the like), since even when individual relatively inexpensive elements are utilized, aberrations introduced by one element of the system may be compensated for by similar but opposite aberrations occurring elsewhere in the system.

In more recent times, the designing of such multi-element systems (and in particular, of especially complex systems using off-axis aspheric elements) has been greatly facilitated by the use of the digital computer which may be programmed to simulate the performance characteristics of each of the individual elements of the system, and which is then able to calculate the overall system performance by tracing a number of different simulated ray paths from one end of the system to the other, performing the same calculations over and over again as individual parameters (such as the focal length or location or index of refraction) of each particular element are varied. In such a manner, the optical designer can be sure that within the constraints specified by a particular design concept, he has optimized the variables at his disposal in accordance with the requirements of a particular application.

Another recent advance in optics technology relates to the precision manufacture of rotationally symmetric optical elements (such as mirrors in the shape of paraboloids and hyperboloids and other solid conic curves) by precision numerically controlled machining on an air-bearing lathe using a polished diamond cutting tool. Especially at the longer wavelengths employed in infrared viewers, the resultant machined surface is sufficiently free from significant surface irregularities that no further polishing is required.

Thus, it can be seen that as a result of state of the art design and manufacture methods, it is possible to create an optical system having a theoretically optimal performance from individual elements that may be readily and inexpensively fabricated. However, in order to secure the optimal performance inherent in the system design, it is necessary that the individual elements be precisely aligned—both rotationally and translationally—with respect to each other.

2. Description of the Prior Art

Traditionally, this has been achieved by adding the individual elements to the system under construction one at a time as accurately as possible, testing the performance of the resultant subsystem at every step of the construction process by means of precision optical measurement techniques, making minor manual adjustments to the position of the element introduced at the current step until a pre-established criterion unique to that step has been met. As can be seen, this is essentially a manual process that requires a highly skilled optical technician, since each successive step of the process requires that all prior steps had been done within the pre-allocated error budget. In the event that the completed system did not perform satisfactorily, it was not always possible to determine which step (or steps) had not been performed with the required accuracy. If the misalignment was relatively minor and did not involve several mutually interdependent misadjustments, the following approach would sometimes prove effective. Each possible adjustment in the entire system was tested in sequence to determine whether or not a minor perturbation in its setting would effect a noticeable improvement in the performance of the system as a whole. If no noticeable improvement resulted, the adjustment was left as it was; otherwise the amount of the adjustment would be increased (or decreased) until no further improvement in overall system performance could be observed. In other words, the technician aligning the system followed up the slope of the curve expressing performance as a function of the adjustment variable in question until a plateau was reached. However, as should be apparent, there was no guarantee that the plateau would be a true maximum or that the alignment in question was sufficiently independent of the other adjustments in the system that such a sequential method would necessarily result in an optimal or even an acceptable level of performance being attained. In the event that such a sequential alignment attempt proved ineffective, then the system had to be completely dismantled and the whole assembly procedure repeated. There was no prior art technique of general applicability that could be used to determine which combination of adjustments was required in order to optimize the performance of the system as a whole.

Accordingly, although there have been substantial advances such that it is now possible to fabricate optical elements of high quality at low cost, there has not been a corresponding advance in the art of assembling those individual elements in accordance with a particular system design.

The problem discussed above may be referred to as the "initial alignment" problem and is primarily the concern of the manufacturer.

However, there is a related problem that is primarily the concern of the user, that is to say the problem of "maintaining alignment" in the system when it is subjected to adverse environmental conditions and even possible physical abuse. In the past, it was considered the responsibility of the designer and manufacturer of the optical system to mount the individual elements within a mechanical frame that was sufficiently sturdy and rigid (and if necessary provided with thermal compensation mechanisms which maintain critical a priori relationships even when thermal forces have resulted in the expansion or contraction of the individual optical and/or mechanical elements). Obviously, the practical difficulties in maintaining alignment by means of prior art techniques were less severe for those applications in which the size of the individual optical elements as well as the size of the overall system was not especially large and wherein the environmental conditions were not especially extreme (such as a telescopic sight on a hunting rifle). On the other hand, as the size and weight of the system and its individual elements is increased and as the anticipated environmental conditions become more extreme, a passive mechanical solution becomes increasingly cumbersome, expensive and impractical.

As an example of an optical system wherein it clearly would be impractical to rely solely on mechanical design expedients to maintain the system in alignment, mention may be made of a high resolution telescope intended to be used aboard a space shuttle vehicle. When pointed towards the sun, such a telescope will experience a high influx of heat. On the other hand, when it is pointed to outer space, heat will actually radiate from the telescope into the depths of space. Furthermore, if it is to produce a bright image over a wide field of view, a large effective aperture is required which means larger (and more massive) individual optical elements that must be aligned even more accurately. Finally, even though the system will be subjected to varying gravitational conditions and high vibration and other mechanical stresses (particularly during the launch of the space vehicle), for reasons of cost it is obviously important to keep the overall mass of the system as low as possible. Moreover, in addition to the original alignment of the system during its manufacture on the ground there is the re-occurring need for maintaining (or even re-establishing) the alignment of the individual elements while the system is in orbit. As can be appreciated, the prior art alignment techniques were trial and error in nature and depended on the intuition and experience of a trained technician. However, even if they could readily be adapted to the automated environment of an active alignment system, because of their sequential nature, they would still be time-consuming and would therefore detract from the efficient use of the system and would in any event have a rather lengthy time constant that would not be adequate in an especially adverse environment.

SUMMARY OF THE INVENTION

Accordingly, it is a generalized objective of the present invention to provide new and useful optical alignment methods and apparatus having considerable advantages over the prior art.

It is a related but more specific objective to provide a method of achieving initial alignment in an optical system having several different individual optical elements that will enable the assembled system during the alignment process.

Yet another related objective is to provide such a method wherein a digital computer may be utilized to compute simultaneously the different alignment adjustments required for each of the optical elements in the system, and which, in accordance with other related more specific objectives, may then be either manually performed by a human technician or automatically by means of remote control servo mechanisms associated with the optical system.

It is yet another objective to provide a new and useful alignment method that can be utilized in the manufacture of complex optical systems (such as off-axis aspheric optical systems) which cannot be conveniently aligned utilizing conventional alignment techniques.

It is another broad objective of the present invention to provide new and useful methods and apparatus for automatically maintaining optimal alignment of a complex optical system while it is in use, to actively compensate for thermal shifts and other environmental effects.

It is a related objective to provide the optical system with the additional apparatus required to maintain such alignment by means of an active alignment system that responds to measured degradations in the system's performance so as to maintain the performance at a desired optimal level.

Briefly, the foregoing and other similar and related objectives as will become further apparent from a review of the following Detailed Description of the Invention, may be achieved in accordance with the teachings of the present invention by (a) creating an analytical model of a certain design in which the individual elements have a priori translational and rotational relationships with each other so as to result in a calculated level of performance that is essentially optimal, (b) assembling a completed physical example of said certain design, (c) measuring a plurality of predetermined characteristics associated with the optical performance of said physical example, (d) calculating simultaneously a plurality of estimated adjustments to said translational and rotational relationships of said analytical model which result in a degraded system having calculated performance characteristics essentially comparable to those that have been measured for said physical example, and (e) making compensating adjustments to said physical example, based on said plurality of estimated adjustments calculated to result in said degraded analytical system but in the opposite direction.

For a better and more complete understanding of the present invention as exemplified by one or more preferred embodiments thereof, reference is made to the following Detailed Description of the Invention and the appended Drawings in which:

BRIEF DESCRIPTION OF THE DRAWINGS

FIG. 3 illustrates another complex system that would be difficult to align and maintain in alignment utilizing conventional alignment techniques;

FIG. 4 comprises FIGS. 4a and 4b which are respectively ray diagrams in the vertical plane and in the horizontal plane for the type of optical system shown in FIG. 3;

FIG. 5 is a horizontal cross-section view of a particular embodiment of the optical design shown in FIGS. 3 and 4 with various supporting structure including the individual micrometers used to make alignment adjustments also being shown;

FIG. 9 is a flow diagram for a second order approximation technique that may be utilized on intensity data from operational detectors.

DETAILED DESCRIPTION OF THE INVENTION

Figure 1:
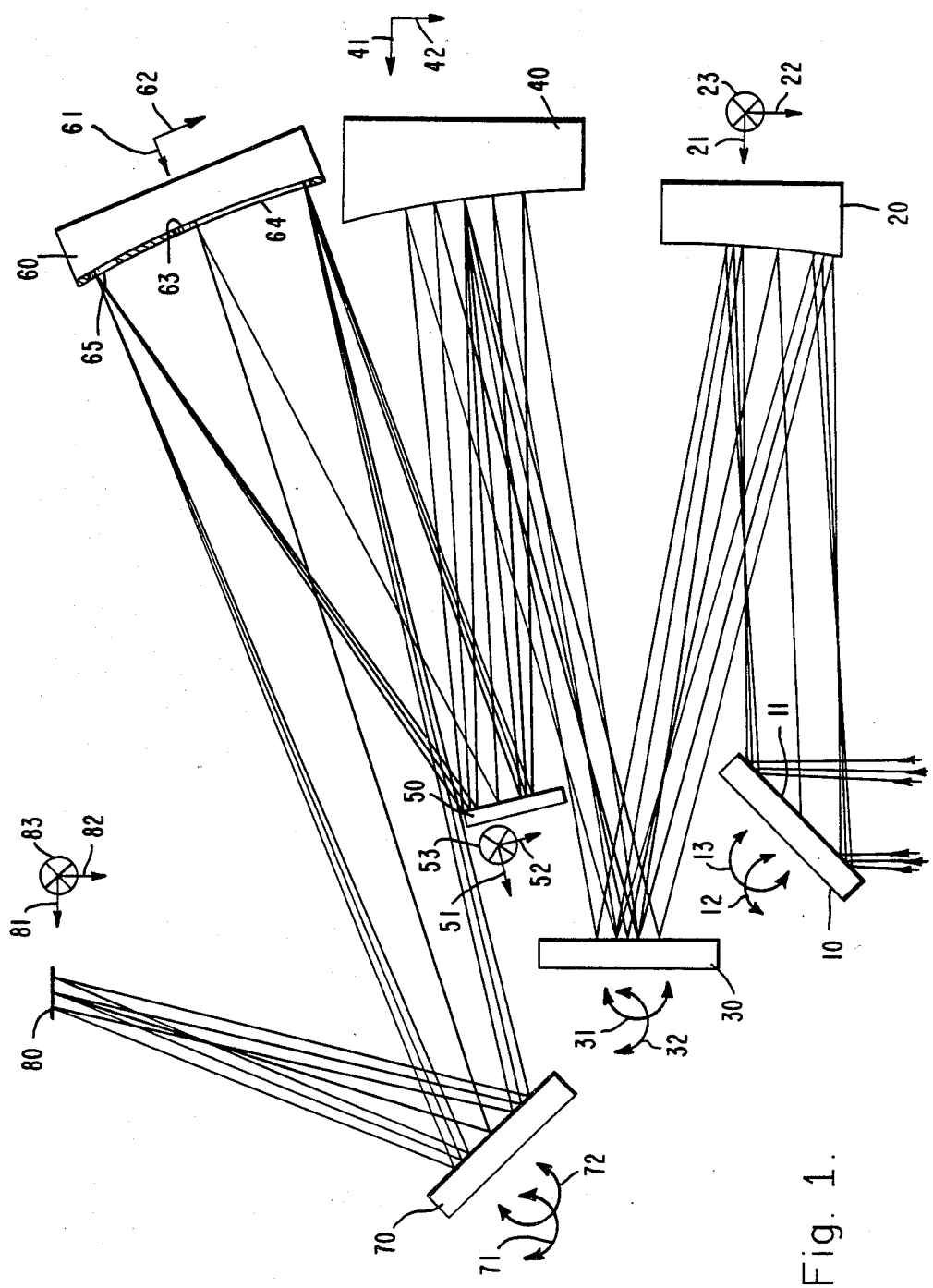
FIG. 1 illustrates a complex optical system having a total of 19 degrees of freedom with respect to the possible alignment adjustments which may nevertheless be aligned in accordance with the teachings of the present invention.

Referring now to FIG. 1 which illustrates a complex optical system having a total of 19 degrees of freedom with respect to the possible alignment adjustments, it will be seen that the rays from a distant object (not visible in the figure) are reflected by a pointing mirror 10 having a flat reflecting surface 11 towards a primary parabolic mirror 20 which as illustrated in the figure is formed from a section of a parabola offset from its central axis of rotation. Two degrees of freedom are associated with pointing mirror 10, diagramatically shown in the figure by means of first arcuate arrow 12 and second arcuate arrow 13. Each of these arcuate arrows symbolically represents possible rotation about a corresponding one of two mutually orthogonal axes, each also orthogonal to the optical axis of the pointing mirror itself.

Only two degrees of freedom are associated with the adjustable mount for the pointing mirror 10, since as noted above it is a flat mirror and accordingly rotational or translational movements in the plane defined by its reflective surface will have no apparent optical effect, while a translational movement in the direction normal to said plane will merely have the effect of altering the effective distance between the image and primary mirror 20 which may be fully compensated for by translational movements of the primary mirror itself.

Primary mirror 20 is provided with three translational degrees of freedom in its adjustments, represented by straight arrows 21, 22 and a third arrow perpendicular to the plane of the figure and conventionally represented by means of two intersecting lines within a circle 23. Primary mirror 20 is not provided with any rotational (or tilting) adjustments, since by means of appropriate adjustments to the pointing mirror 10 and to the first folding mirror 30 (which it will be noted is also an optically flat surface), it is possible to compensate for any possible tilting misalignment on the part of the primary mirror 20.

Referring now specifically to first folding mirror 30, it may be seen that this flat mirror is provided (in a manner similar to that of pointing mirror 10) with two rotational adjustments about mutually orthogonal tilting axes 31 and 32 (as discussed previously with respect to pointing mirror 10, since the mirror is flat, only two rotational degrees of freedom are required).

The next optical element in the system illustrated in the figure is a secondary mirror 40, which is provided with two translational degrees of freedom represented by straight arrows 41 and 42. Secondary mirror 40 is also an off-axis parabolic section and is concave in nature. From secondary mirror 40 rays from the object then are reflected on to tertiary mirror 50 provided with three translational degrees of freedom indicated symbolically by arrows 51, 52 and 53 (the third being perpendicular to the plane of the figure).

From tertiary mirror 50, the rays from the object then converge on to a fourth mirror 60 provided with two translational degrees of freedom 61 and 62. It will be noted that front surface 63 of fourth mirror 60 is located at the internal stop plane of the system wherein a fixed aperature stop 64 or a Hartmann mask opening 65 may be located, since light from the object is not the least bit focused as an image at that location, but rather arrives at the front surface of fourth mirror 60 as a more or less continuous wave front with each individual region of the wave front carrying essentially the same information about the object.

The rays are then further reflected by means of a second folding mirror 70 provided with two rotational degrees of freedom 71 and 72 onto an image plane 80. As shown in the figure, image plane 80 is also provided with three translational degrees of freedom 81, 82 and 83.

Thus, it can be seen that the system of FIG. 1 has a total of 19 degrees of freedom for rigid body motion. In one specific example that was actually constructed and aligned in accordance with teachings of the present invention, the design covered a three degree by ten degree field of view and had a resolution of 20 microradians. Since the design had no centered optical elements it would have been exceedingly difficult, (if not impossible), to align in accordance with conventional alignment techniques.

Referring now to FIG. 2 (comprising six subfigures, namely FIGS. 2a, 2b, 2c, 2d, 2e and 2f), it will be recalled that these series of figures relate to the performance of the system of FIG. 1 prior to and subsequent to its being aligned in accordance with the teachings of the present invention.

Figure 2A:
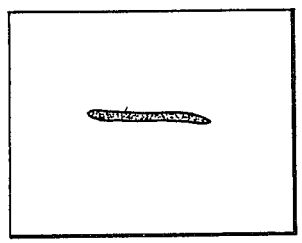
FIGS. 2a, 2b and 2c showing the starting condition prior to the alignment, FIG. 2d showing the resultant image after one alignment pass, FIG. 2e illustrating a so-called Hartmann mask which may be utilized to analyze an image as a series of discrete centroid shift points and FIG. 2f showing a five point image produced by the Hartmann mask of FIG. 2e.
Figure 2B:
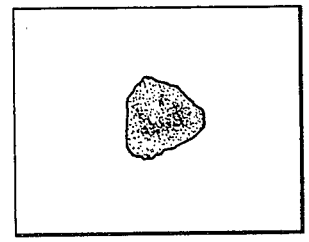
Figure 2C:
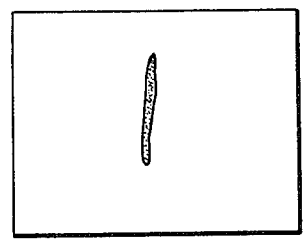

FIGS. 2a, 2b and 2c show the starting condition prior to the alignment. It will be seen that the image of a point source of light was highly astigmatic, with FIG. 2a showing the resultant image when the system was focused so that the image plane lay at the outside of the astigmatic image while FIG. 2c shows the resultant image when its inside edge coincided with the image plane. FIG. 2b shows a best or intermediate focus position in which the image is spread over a considerable area (on the order of 0.055 inches or 0.13 millimeters which corresponded to approximately 400 microradians). It will be recalled that the system's theoretical resolution capability was on the order of 20 microradians.

Figure 2D:
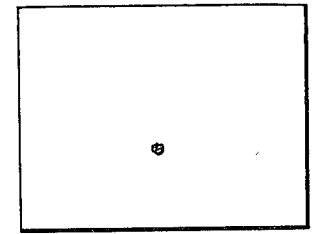
FIG. 2 comprises a total of six subfigures relating to the performance of the system of FIG. 1 prior to and subsequent to its being aligned in accordance with the teachings of the present invention.

In FIG. 2d, which shows the resultant image after one pass of the present alignment technique, it may be seen that the image has in fact been reduced in size to what is considered to be optimal system performance.

Figure 2E:
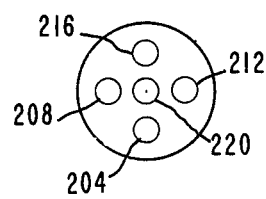
Figure 2F:
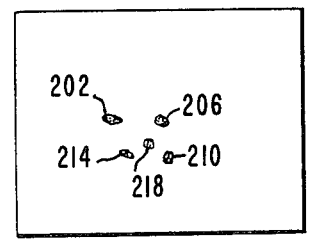

FIG. 2e illustrates a so-called Hartmann mask which may be located at the inner stop plane of the system and utilized to analyze the image at the image plane at the best focus condition (see FIG. 2b) into a series of discrete centroid shift points having readily measured X and Y coordinates from which may be conveniently derived aberrations in the slope of the wave front at each of the subapertures of the Hartmann mask relative to its central subaperture. Thus, the five point image of FIG. 2f was produced with point 202 at the top left corresponding to Hartmann mask bottom center subaperture 204, point 206 at the top right corresponding to left subaperture 208, point 210 at the bottom right corresponding to right subaperture 212 and bottom left point 214 corresponding to top subaperture 216. Thus, by the expedient of utilizing such a Hartmann mask, a bad image can be readily quantified into a set of X and Y centroid shifts from a normal position 218 corresponding to central subaperture 220.

FIG. 3 illustrates another complex optical system employing aspheric optical elements or units that would be difficult to align and maintain in alignment utilizing conventional alignment techniques.

In this design, rays of light R1 and R2 from a distant object fall on primary mirror 300 which has a concave reflective surface in the shape of a paraboloid with its axis of rotation displaced somewhat below the geometric center of the mirror itself. The light rays are thus reflected towards secondary mirror 302 which is in the shape of a convex paraboloid, again with its axis of rotation somewhat displaced from its center. From convex parabolic mirror 302, the rays of light from the object being viewed are then reflected by a flat folding mirror 304 towards a tertiary mirror 306 which has a concave reflecting surface in the shape of a paraboloid with its axis displaced from the center of the mirror. From tertiary paraboloid mirror 306 the rays of light of the image are then reflected off a flat scanning mirror 308 towards the image plane (which may contain a photographic plate, an array of charge coupled devices (CCD'S) or other appropriate apparatus for recording and/or displaying the focused image produced by the system). For an optical system of the type shown in FIG. 3 having a primary paraboloid mirror with a diameter of approximately 50 centimeters and a secondary mirror diameter of approximately 10 centimeters, with the radii of curvature and conic constants for the various mirrors being chosen so as to result in an approximately 1° by 3° field of view, the theoretical resolution has been calculated to be 5 microradians.

FIG. 4, it will be recalled, comprises two subfigures, FIG. 4a, a ray diagram in the vertical plane and FIG. 4b, a ray diagram in the horizontal plane, for the type of optical system as is illustrated with an axis of rotation somewhat displaced from its center in FIG. 3.

Referring now to FIG. 4a, it may be seen that the rays from wavefront A B C D from a distant object impinge on primary mirror 300 as wavefront A' B' C' D', with the portion of the wavefront from point B to point C (or B C) being occluded by secondary mirror 302. From primary mirror 300 the wavefront is then reflected as shown at A" B" C" D" from secondary mirror 300 to the upper portion of tertiary mirror 306 and thence downwardly to the exit pupil 400 in an inverted form as wavefront d c b a. It will be noted that as a result of the vertical asymmetry of primary mirror 300, the wavefront at the point in which it reaches secondary mirror 302 is displaced slightly upwards of the horizontal section line of the telescope and is deflected even more upwardly onto tertiary mirror 306. In the vertical plane, the design field of view is approximately one degree and as aforesaid the resolution is approximately 5 microradians. It should be noted that in the interests of clarity, folding mirror 304 and scanning mirror 308 of FIG. 3 have been omitted from the ray diagram of FIGS. 4a and 4b.

Referring now particularly to FIG. 4b which is a ray diagram of the telescope of FIG. 3 in the horizontal plane, it may be seen that at least in the horizontal plane, the design of the telescope is bilaterally symmetric, thus wavefront A B C D from the distant image is reflected off of primary mirror 300 as wavefront A' B' C' D', thence off secondary mirror 302 as wavefront A" B" C" D" and is directed to the center of tertiary mirror 306 whence it leaves exit pupil 400 as inverted wavefront d c b a.

Such a design as has been described above with reference to FIGS. 3 and 4 is very sensitive to alignment errors of the secondary mirror in tilt, centering and spacing. To maintain an optical system that has close to perfect image quality, the RMS wavefront error should not exceed 0.07 waves. Thus, a centering alignment error as small as 0.007 millimeters of secondary mirror 302 in a direction perpendicular to the optical axis of the telescope will increase the calculated RMS wavefront error by 0.07 waves (at a visible wavelength of 0.5 micrometers), and thereby cause a perceptible degradation in performance. A similar degradation in performance has been calculated to occur in the event of a tilting misalignment of secondary mirror 302 in the amount of 0.022 milliradians. The design is also quite sensitive to spacing of secondary mirror 302 with respect to primary mirror 300, since a misalignment of only 0.002 millimeters will also result in a calculated increased RMS wavefront error by the amount of 0.07 waves. However, such a spacing error can be partially compensated for by refocusing the telescope by means of tertiary mirror 306 (which is the focusing element in the design). If the possibility of refocusing is taken into account, then secondary mirror 302 may have a spacing alignment error as much as 0.038 millimeters before the RMS wavefront error has increased to 0.07 waves.

The design is rather less sensitive to alignment errors in tertiary mirror 306. A tilting misalignment of 0.249 milliradians or a centering misalignment of 0.118 millimeters being required prior to an RMS wavefront error increase in the amount of 0.07 waves.

It should also be noted that by providing compensating alignment adjustments to the tilt, centering and spacing of secondary mirror 302 and tertiary mirror 306, the design is much less sensitive to deviations in the radius of curvature and conic constant associated with each of the mirrors. Thus, in the case of primary mirror 300, a change in radius of curvature of 0.0031% will degrade the RMS wavefront error to 0.07 waves (assuming that the system is refocused to accomodate any change); however, if realignment of the elements is permitted, then the same amount of image degradation will not ensue until the radius of curvature has varied by as much as 1.23%. In a similar manner, a 0.063% change in the conic constant of primary mirror 300 will result in a degraded image having a RMS wavefront error of 0.07 waves if only refocusing is provided for, while the design is more than ten times less sensitive to changes in conic constant if realignment is permitted.

In the case of secondary mirror 302, the corresponding percentage changes in radius of curvature with refocusing is only 0.15%, with realignment 2.35%

(more than 150 times less sensitive), and for conic constant with refocusing only 0.051%, and with realignment 5.68% (more than a 100-fold reduction in sensitivity).

With respect to tertiary mirror 306, it can be shown that there is also a reduced sensitivity to changes in radius of curvature and conic constant in the event that the system can be realigned to compensate therefor; however, tertiary mirror 306 is not especially sensitive to such changes in any event.

The above considerations of sensitivity, particularly with respect to the radius of curvature, are especially important if one considers such a system may be utilized in different thermal environments. If an equilibrium condition is assumed to exist when the telescope is looking at the earth from an orbiting platform, then when the telescope is pointed into deep space there will be a heat loss. If the telescope is pointed near (but not directly at) the sun there will be a gain of thermal energy. In addition, changes in gravity itself will tend to affect the radius of curvature and to a lesser extent the conic constant of the individual mirrors.

Thus, in the case of a lens system that will originally be assembled and tested on the ground prior to its being placed in orbit, it is clearly advantageous to provide the system with means whereby the individual elements of the system may be realigned once the system has been placed into orbit, and (especially if it is to be utilized under different thermal conditions) thereafter at regular intervals.

To some extent prior art passive thermal control and passive structural control will reduce the magnitude of the sensitivity problem. However, an active control system that is responsive directly to the system's optical performance is clearly the best way of maintaining performance at an optimal level, and under difficult environmental conditions is probably the only approach which should be employed in many optical system designs that are particularly sensitive to alignment errors.

FIG. 5 represents in horizontal cross-section the same design as was illustrated in FIGS. 3 and 4 but also showing the various supporting structure including some of the individual micrometers which may be used to make the alignment adjustments associated with secondary mirror 302 and tertiary mirror 306. Thus, the whole telescopic assembly is held in a gimbal ring 500 which passes through the telescope's center of mass and which supports an outer tube 502. At the front of outer tube 502 there is provided a plurality of inwardly projecting arms 504 for supporting a secondary mirror structure indicated generally by reference numeral 506 and comprising a barrel portion 508, a rigid rear portion 510 and a backing plate 512 to which is attached secondary mirror 302.

Secondary mirror backing plate 512 is connected to the rigid rear portion 510 by means of a plurality of adjustable micrometers 514. Preferably, these micrometers are six in number, corresponding to the six possible degrees of freedom (three translational and three rotational) associated with secondary mirror 302 with respect to the rest of the system, and in particular with respect to outer tube 502 to which primary mirror 300 is rigidly mounted. By arranging the six micrometers in a three-dimensional zig-zag type of arrangement, wherein their respective forward ends are attached to three points defining a plane on backing plate 510 and their rearward ends are attached to three points defining a plane on mirror support plate 512, no unwanted stresses will be transferred to the mirror and its associated backing plate through the legs of the micrometers. By appropriate lengthening or shortening adjustments of one or more of the micrometers, any desired combination of tilting and translational adjustments to the mirror may be accomplished. Micrometers 514 and 518 may conveniently be adapted for automatic operation in a computor controlled servo loop, which will permit the alignment process to be carried out automatically without the intervention of any human technician.

As noted above, primary mirror 300 is rigidly mounted with respect to outer telescope tube 502. A central light shield 514 passing through a corresponding bore in the middle of primary mirror 300 provides an optical path from secondary mirror 302 to the region behind primary mirror 300 in which the rear optical subassembly (indicated generally by reference numeral 516) is located. This rear subassembly includes folding mirror 304 and tertiary mirror 306. As noted previously, tertiary mirror 306 is also adjustable in position with respect to the fixed elements of the system such as outer tube 502 and primary mirror 300, and is also supported by means of six adjustable micrometers 518. From tertiary mirror 306, the light from the object being observed is reflected onto a scanning mirror (not visible in FIG. 5) and thence through an exit pupil onto the image plane itself which in the case of the design illustrated is a 100×100 charge coupled device (CCD) array having 10,000 individual elements.

Although not shown in the figure, such a telescope can conveniently be provided with additional optical subsystems in rear subassembly 516 having different fields of view and optimized for different wavelengths of light (e.g., infrared or visible), with wide field optics being preferred for initial acquisition of a target object and narrow field of view optics preferred for detailed observation and/or tracking functions. By means of half-silvered mirrors or other appropriate beam splitting devices, it is possible for several such subsystems to be used simultaneously.

Figure 6:
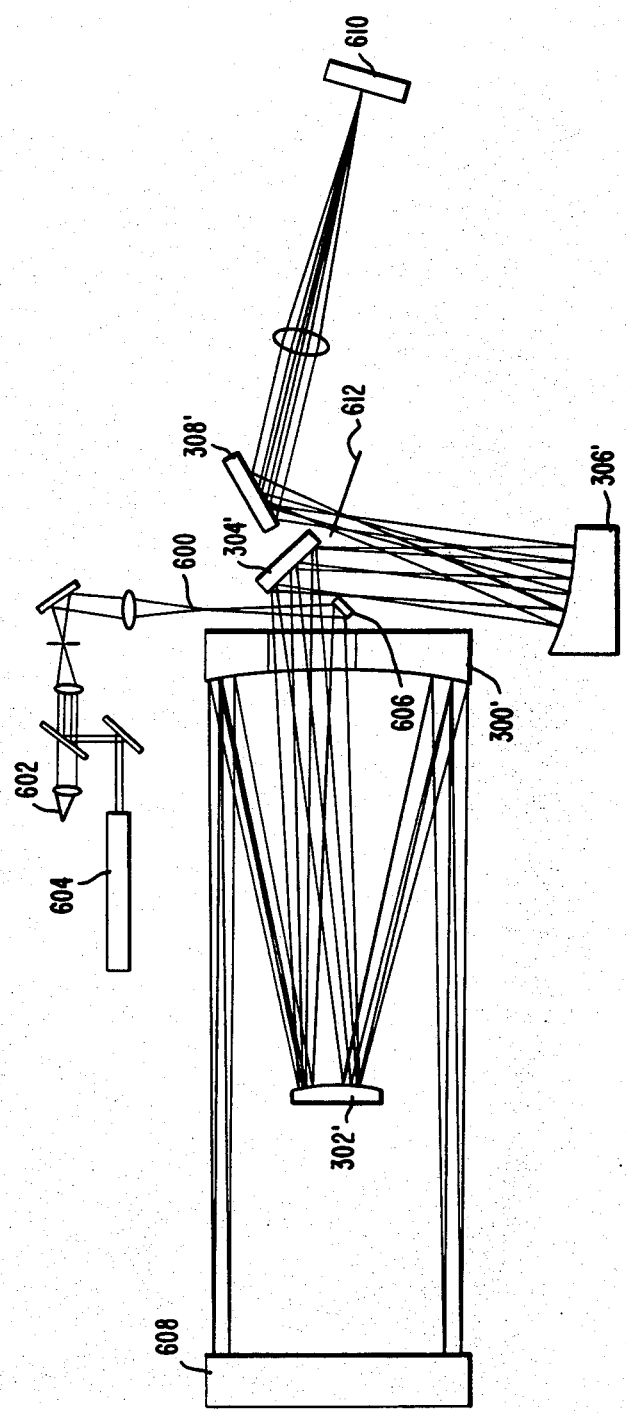
FIG. 6 shows a laboratory brass board model of a telescope design similar to that shown in FIGS. 3 through 5.

FIG. 6 represents a scaled-down laboratory model of the telescope design discussed above in connection with FIGS. 3 through 5. As a matter of fact, FIG. 6 is a so-called brass board design which may be constructed to verify the various performance capabilities of the actual system design but which, rather than being focused on distant object such as a star in outer space, is provided with a test object in the form of a narrow beam of light 600 generated either by a gallium arsenide light emitting diode 602 or a helium neon laser 604 which is reflected by means of a small folding mirror 606 onto a secondary mirror 302' (the ' symbol being utilized to indicate that the element is analogous to an element having a similar numerical designation discussed previously, in this case secondary mirror 302 of the optical system illustrated in FIG. 3). From secondary mirror 302', the rays of light from the light emitting diode or the laser are reflected off of mirror 300' to a flat mirror 608, thence back to the remainder of the system in the manner previously described with respect to the system of FIGS. 3 and 4, just as though they originated with a distant object—i.e., starting with primary mirror 300', then to secondary mirror 302', then via folding mirror 304', tertiary mirror 306', and thence to a third folding mirror 308', from which they are finally focused onto a CCD array 610.

Also visible in FIG. 6 is the aperture stop plane 612 in which a suitable aperture stop may be located to reduce the effective aperture of the system and in which (as is discussed in more detail elsewhere) a so-called Hartmann mask may be located when it is desired to make wavefront slope measurements or otherwise to examine a particular portion of the entire wavefront from a distant object as it progresses through the optical system.

Figure 7:
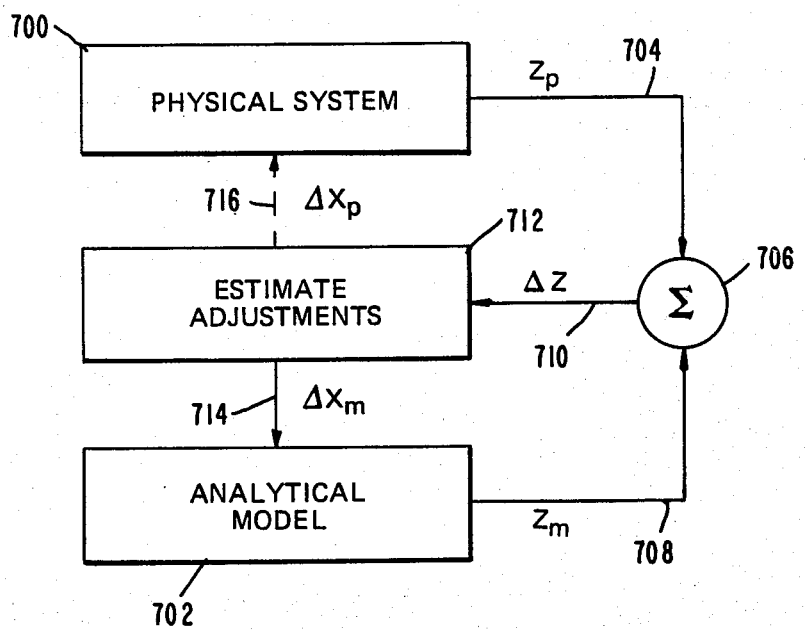
FIG. 7 is a simplified block diagram showing the basic control concept underlying the present invention.

FIG. 7 is a simplified block diagram showing the basic control concept underlying the present invention. Block 700 represents a particular example of a real world system that is to be aligned. Block 702 represents an analytical model of a system design corresponding to the physical system symbolized by block 700. The actual measured performance represented by flow line 704 of the physical system 700 is compared by compare logic 706 with the calculated performance 708 of analytical model 702. Compare logic 706 generates an output 710 which controls adjustment logic 712. Adjustment logic 712 causes analytical model 702 to be adjusted via flow line 714 to the point where compare logic 706 determines that the series of adjustments have sufficiently degraded the calculated performance of the analytical model so that it is essentially comparable to the actual measured performance of the physical system, whereupon a corresponding series of adjustments (equal in magnitude but opposite in sign to those of flow line 714) is applied via flow line 716 to the physical system 700 thus completing one alignment pass. The analytical model may then be reinitialized to its original a priori optimal condition corresponding to zero adjustments. Performance measurements are then taken on the physical system which has now been adjusted in accordance with the results of the first pass and any significant deviation between the measured performance and the calculated performance of a theoretically perfectly aligned system will cause a further set of adjustments being performed on the physical system and a second alignment pass being completed.

In practice, for such a concept to work satisfactorily over a wide range of conditions, careful thought must be given to the manner in which "performance" of the system is defined and measured. In this regard, it is useful to think in terms of a state vector and a performance vector. The state vector is the set of parameters that defines the input condition of either the physical system or the analytical model in terms of the condition (or state) of its various alignment adjustments.

Subsequent computation is considerably simplified if the various components forming the state vector are mutually orthogonal, that is to say the particular parameters chosen as the individual components of the state vector may be individually varied or adjusted without any resultant effect on the other parameters or components.

With respect to the selection of the individual components used to define a suitable performance vector for a particular system, it should be born in mind that the control algorithm infers or calculates the required set of adjustments (which is, from a mathematical point of view, merely the difference between the state vector associated with a perfectly aligned system and the state vector associated with the present condition of the system) from measurements of the performance vector. Accordingly, the performance vector must have at least as many components as the state vector. Furthermore, the type of data reflected in the performance vector should be adequate to indicate the presence of any possible alignment error or "aberration".

Two readily available forms of image quality measurement are intensity data at the focal plane and wavefront data at the pupil. The derivation of the estimated error in the state vector from the measured performance vector is considerably simplified if a linear relationship can be presumed to exist. Accordingly, wavefront slope data (that may be easily quantified as a series of image centroid shift measurements acquired by means of a Hartmann mask as described above with reference to FIG. 2) which has approximately a linear (even for relatively severe misalignments) relationship to change in alignment, is a particularly suitable basis for defining the performance vector. Since the system cannot be presumed to be in alignment, it is not possible to assume any symmetry in slope data about the arbitrarily selected central subaperture. Accordingly, it is desirable that the wavefront slope measurements be made at at least three different regions or subpupils. Furthermore, regardless of the number of different subpupils utilized, a set of wavefront slope measurements based upon the observation of only a single object at a particular point in the field of view will not adequately define even a simple tilting misalignment of the image plane itself and accordingly performance measurements should be made at least three different points within the system's field of view. In the system discussed previously with respect to FIGS. 1 and 2, measurements were taken at four different subpupils relative to a fifth central subpupil and the process was repeated for a total of three different points in the field of view for a total of two (X and Y centroid shift components) times four (different subpupils) times three (points in field of view) equals 24 components to the performance vector. It will be recalled that the system had 19 degrees of adjustment freedom. Accordingly, the performance vector had five more components than did the state vector. Such a selection of parameters for defining the performance vector was experimentally determined to be adequate for inferring the required adjustments so that the system could be aligned to achieve its theoretical optimum performance.

As noted above, a linear estimation technique considerably reduces the complexity of the required calculations and is based upon the assumption that (at least for smaller changes in the state vector), there is an approximately linear relationship between each component of the performance vector and each component of the state vector. Thus, a sensitivity matrix [h] can be constructed whereby a change in the performance vector $\vec{\Delta Z}$ can be derived from a given state vector error $\vec{\Delta X}$ in accordance with the following simple relationship:

$$\vec{\Delta Z} = [h]\vec{\Delta X} \qquad (1)$$

The particular values associated with the sensitivity matrix [h] can either be calculated from prior knowledge of the optical design of the system (especially if a software analytical model was utilized to create the particular design) or by using the physical system as an analog computer each component of the state vector by a predetermined small amount and measuring the resultant changes in each component of the performance vector. It is desirable that the matrix be well-conditioned, that is to say, equally sensitive to changes in each of the components of the state vector; this may be conveniently achieved by using smaller finite differences to quantify the more sensitive adjustments so that the sum of the square of all the elements in each column of the sensitivity matrix (each column corresponding to a different component of the state vector) will then be approximately the same.

Using conventional matrix algebra, it may be shown that equation (1) implies (assuming a linear relationship as aforesaid) that for a given deviation from optimal performance $\Delta Z$, the state vector error $\Delta X$ that will result in calculating the degraded performance which "best" (i.e., least squares) approximates a measured degraded performance $\Delta \vec{Z}$ is given by the following:

$$\Delta \vec{X} = ([h^T][h])^{-1}[h^T]\Delta \vec{Z} \qquad (2)$$

It should be emphasized that a local linear approximation technique may be utilized even if there is not a strict linear relationship between the performance vector and the state vector since it is possible to recompute the sensitivity matrix whenever it appears that the indicated adjustment estimate generated by a particular set of sensitivity matrix values does not result in a corresponding improvement in measured performance.

Figure 8:
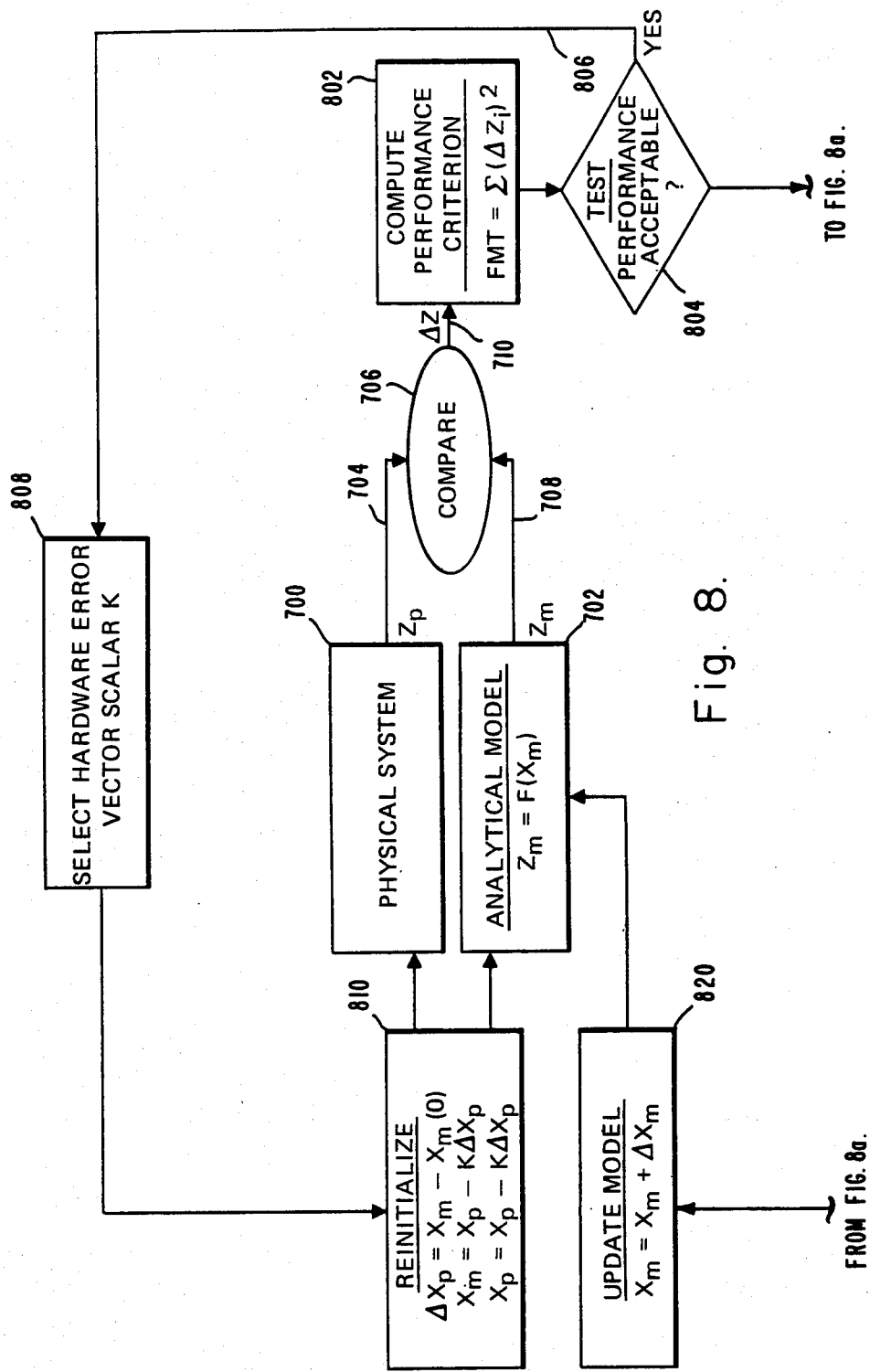
FIG. 8 is a block diagram of a more sophisticated version of the conceptual diagram of FIG. 7 in which a linear approximation technique is used.
Figure 8A:
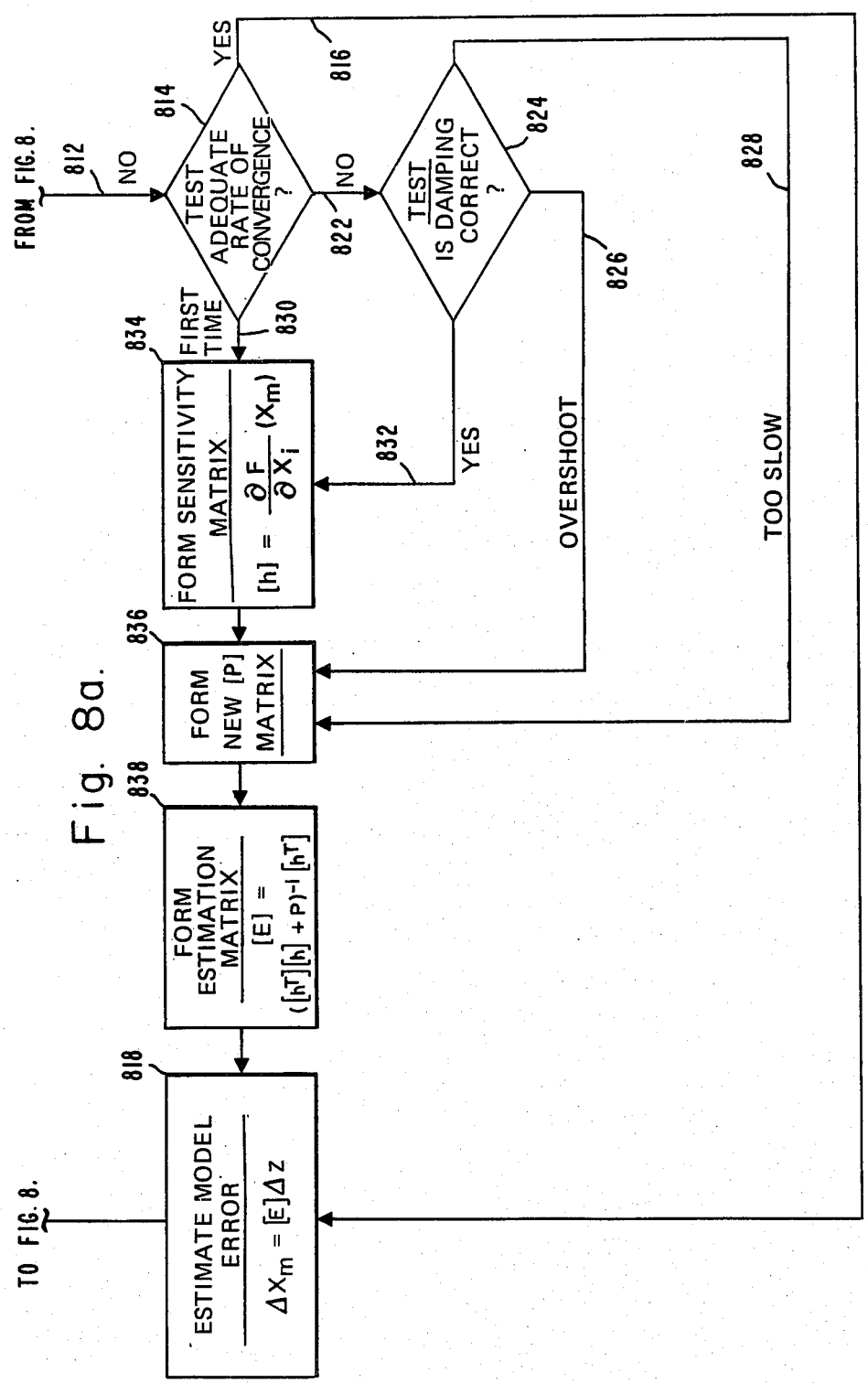

FIG. 8 represents in block diagram form a rather more sophisticated version of a model reference adaptive system. As was true in the case of the conceptual diagram of FIG. 7, the physical system (block 700) has performance measured as a performance vector $\vec{Z}_p$. Block 702 is a corresponding analytical model which computes the model's calculated performance vector $\vec{Z}_m$ (flow line 708) as a function $F(\vec{X}_m)$ of the corresponding state vector $X_m$ for the model. As noted above, the function F is in general not a linear function (or for that matter a function having linear derivatives). In any event, comparison logic 706 generates a performance error $\Delta \vec{Z}$ which is utilized in block 802 to compute a "figure of merit" or performance criterion FMT utilizing the sum of the squares of the individual components $\Delta Z_i$ of the error vector $\Delta \vec{Z}$.

The figure of merit calculated in block 802 is then tested in block 804 to determine whether or not the calculated performance is sufficiently close to the measured performance of the physical system. If the answer is "yes", as indicated by branch 806, then a damping factor K is updated in block 808 and a damped adjustment (which may be less than 100% of the estimated adjustment, as determined by the value of K) is applied to the physical system of block 700, with block 810 computing the estimated total required state vector adjustment $\Delta \vec{X}_p$ by determining the difference between the current state vector of the model $\vec{X}_m$ and the corresponding state vector $\vec{X}_m(0)$ prior to any realignment passes; the model is then reinitialized by restoring it at least partially (fully, if K is equal to 1) to its initial state $\vec{X}_m(0)$ and a corresponding physical correction $(-K \cdot \Delta X_p)$ is made to the physical system. The resultant performance of the adjusted system and of the correspondingly reinitialized model is then compared in block 706. The performance error $\Delta \vec{Z}$ is now utilized to compute a new figure of merit FMT in block 802 which if still acceptable, then the alignment process is at an end, at least for the time being.

On the other hand, if the resultant figure of merit is not yet acceptable (branch 812) FIG. 8b then a test is made in block 814 to determine whether or not there is convergence at an adequate rate, that is to say, whether or not there has been a significant improvement in the computed figure of merit performance criterion compared to the previous cycle through the loop. If such convergence is taking place at an adequate rate (yes branch 816) then control passes directly to block 818 which continues to use the same estimation matrix [E] to generate a further increment in the estimated error $\Delta \vec{X}_m$ by means of a simple matrix multiplication operation of the current performance difference $\Delta \vec{Z}$ (block 820) and the resultant new calculated value for the performance vector $\vec{Z}_m$ is then generated by the model and the procedure repeated.

On the other hand, if the model's calculated performance $\vec{Z}_m$ is not converging at an adequate rate to the measured performance $\vec{Z}_p$ of the physical system (no branch 822) then a further test is made in block 824 to determine whether or not a change in the damping constant associated with damping matrix [P] is likely to improve the rate of convergence. If there is significant overshoot (indicated by a change in sign of many of the components of $\Delta \vec{Z}$ each time the model is updated), then more damping is indicated since the rate of damping is inadequate and the individual weighting factors associated with weighting matrix [P] are increased. On the other hand, if there has been no significant change in any of the components of $\Delta Z$ since the last time the model was updated, then the rate of damping would appear to be excessive and accordingly the various weights associated with weighting matrix [P] are reduced to provide less of a damping effect. In the event that this is the first time through the model updating loop, (branch 830), or the damping appears to be correct (or more precisely is not obviously incorrect) (yes branch 832), then a new sensitivity matrix [h] is formed by calculating the first partial derivative of the model's performance function F for the current value of the state vector $\vec{X}_m$ (block 834). The damping matrix [P] is formed in block 836. If the result of the test in block 824 is that more damping is required (branch 826), then the various weights associated with [P] are scaled upwards by a constant factor greater than one. If it is determined at block 824 that less damping was required (branch 828) then the old weights of [P] are scaled downward by a factor less than one. Finally, if a new sensitivity matrix has been formed in block 834 then the damping matrix [P] is reset to its initial condition. Once the new values for [P] have been determined by block 836, then estimation matrix [E] is calculated in block 838 by means of the formula:

$$[E] = ([h^T][h] + [P])^{-1}[h^T] \qquad (3)$$

It should be noted that damping matrix [P] is a diagonal weighting matrix associated with the respective magnitudes of the current estimate of the required change in the model's state vector $\Delta X_m$. It may be thought of as introducing a cost function into the estimation process since it will have the effect of favoring an error estimate that minimizes the magnitudes of the required adjustments at some sacrifice in calculated performance.

As noted previously, the generic concept underlying the present invention is not restricted to a particular type or category of performance measurements. Wavefront slope measurements generated using a Hartmann mask or other similar apparatus appear to be especially suitable either for the initial alignment of a complex optical system (when significant aberrations can be expected) or when computational facilities are limited (because of the relatively linear relationship between the centroid shift data and the required corrections). However, it should be emphasized that wavefront slope information can, at least theoretically, be inferred from other performance measurements such as the variations in point source images resulting from variations in wavelength, or moments of focal plane intensity at several focus positions (which does not require that the image be the image of a point source, or that it be a fixed image), or even from the entire image in the focal plane at varying focus positions and/or wavelengths.

It should also be emphasized that the generic concept underlying the present invention does not necessarily require that aberrations in the wavefront be measured by means of a Hartmann mask or otherwise receive an explicit analytical consideration. At least for small aberrations (wavefront error of less than 0.35 waves and preferably less than 0.2 waves), it has been experimentally demonstrated that a complex system as shown in FIG. 6 may be maintained in alignment using only data from the operational focal plane detector, whereby the intensity distribution of a point source image may, by means of a second order approximation technique, be used to generate the required individual alignment variables directly.

Since certain aberrations (errors) such as focus and astigmatics at the focal plane are symmetric functions, it is preferable that the focal plane intensity performance measurements be made at two focus positions. However, such a requirement does not necessarily mean an adjustment of focus of magnitude sufficiently to interfere with the operational use of the system.

Because the anticipated aberrations are small, a second order approximation to the intensity function as a function of the aberrations (adjustment errors) will suffice. In that regard, it is to be noted that a simple first order approximation, for example of the form:

$$I(\vec{A}) = I(\vec{O}) + \sum_i A_i \frac{\partial I}{\partial A_i}(O) \quad (4)$$

where $\vec{A} = (A_1, \ldots, A_n)$ is a vector function specifying the aberrations of the real world system analagous to the above-described state vector difference $\Delta \vec{X}$, and where I is the focal plane intensity function relating to the distribution of a single point source image over a two-dimensional array with respect to its point of maximum intensity, analogous to the above-described performance vector $\vec{Z}$. Since the first order partial derivative of the intensity function for many aberrations $A_i$ including focus is equal to zero when the system is properly aligned and since the first order derivative varies rapidly even when small adjustments are made, it can be seen that a first order approximation such as presented by equation (4) is not satisfactory.

This is not true, however, for a second order approximation, which may be of the form:

$$I(\vec{A}) = I(\vec{O}) + \sum_i A_i \frac{\partial I}{\partial A_i} + \tfrac{1}{2} \sum_i \sum_j A_i A_j \frac{\partial^2 I}{\partial A_i \partial A_j} \quad (5)$$

It is possible to solve equation (5) for the required adjustment A given the intensity measurement $I(\vec{A})$ by means of an iterative approach. Consider first how the $(n+1)$th approximation $\vec{A}^{n+1}$ may be derived from the nth iteration $\vec{A}^n$. Define $\vec{\eta}^n = \vec{A} - \vec{A}^n$. Then from equation (5), by substituting $\vec{A}^n - \vec{\eta}^n$ for $\vec{A}$, $$I(\vec{A}) = I(\vec{O}) + \sum_i (A_i^n + \eta_i^n) \frac{\partial I}{\partial A_i} + \tfrac{1}{2} \sum_i \sum_j (A_i^n + \eta_i^n)(A_j^n + \eta_j^n) \frac{\partial^2 I}{\partial A_i \partial A_j} \quad (6)$$

If it may be assumed that $\vec{\eta}^n$ is small relative to $\vec{A}^n$, than it follows that:

$$I(\vec{A}) = I(\vec{O}) + \sum_i A_i^n \frac{\partial I}{\partial A_i} + \tfrac{1}{2} \sum_i \sum_j A_i^n A_j^n \frac{\partial^2 I}{\partial A_i \partial A_j} + \sum_i \eta_i^n \left( \frac{\partial I}{\partial A_i} + \sum_j A_j^n \frac{\partial^2 I}{\partial A_i \partial A_j} \right) \quad (7)$$

The method of least squares may then be used to solve equation (7) for $\vec{\eta}^n$, whereupon $\vec{A}^{n+1}$ may be readily calculated as $A^n + \eta^n$.

Such an iterative algorithm obviously depends upon the initial estimated value for $\vec{A}^1$ being a sufficiently good estimate that $n^1$ is small relative to $\vec{A}^1$; otherwise the algorithm may fail to converge or may converge to a false local minimum. However, there does exist a relatively simple technique for at least partially overcoming such shortcomings by starting out with two performance measurements corresponding to a known difference in state $\delta \vec{A}$. It is then possible to solve simultaneously (still using an iterative least squares best fit approach) both the equation for the initial aberration A (equation (7)) and that for the aberration subsequent to the hardware adjustment $(\vec{A} + \delta \vec{A})$:

$$I(\vec{A} + \delta \vec{A}) = I(\vec{O}) + \sum_i (A_i^n + \delta A_i^n) \frac{\partial I}{\partial A_i} + \sum_i \sum_j (A_i^n + \delta A_i^n)(A_j^n + \delta A_j^n) \frac{\partial^2 I}{\partial A_i \partial A_j} + \sum_i \eta_i^n \left( \frac{\partial I}{\partial A_i} + \sum_j (A_j^n + \delta A_j^n) \frac{\partial^2 I}{\partial A_i \partial A_j} \right) \quad (7')$$

The number of false local minima may thereby be reduced and the dependence upon a good initial estimate may thereby be partially eliminated.

Substracting equation (5) from the corresponding equation for $\vec{A} + \delta \vec{A}$;

$$I(\vec{A} + \delta \vec{A}) = I(\vec{O}) + \sum_i (A_i + \delta A_i) \frac{\partial I}{\partial A_i} + \tfrac{1}{2} \sum_i \sum_j (A_i + \delta A_i)(A_j + \delta A_j) \frac{\partial^2 I}{\partial A_i \partial A_j} \quad (5')$$

results in the following:

$$I(\vec{A} + \delta \vec{A}) - I(\vec{A}) = \sum_i \delta A_i \frac{\partial I}{\partial A_i} + \tfrac{1}{2} \sum_i \sum_j \delta A_i \delta A_j \frac{\partial^2 I}{\partial A_i \partial A_j} + \sum_i \sum_j \delta A_i A_j \frac{\partial^2 I}{\partial A_i \partial A_j} \quad (8)$$

since $I(\vec{A} + \delta \vec{A})$, $I(\vec{A})$ and $\delta \vec{A}$ are all measured quantities, it is thus also possible to derive an estimate for $\vec{A}$ by means of a simple linear equation requiring no initial estimate. However, it should be noted that by taking a difference of two intensity measurements each of which is subject to error in the form of noise, the accuracy associated with such a linear approximation would be less than that of the second order iterative approach discussed above. Accordingly, for many applications it is preferable to utilize equation (8) (which if $\vec{\delta A}$ is a predetermined quantity, may be solved using a simple matrix approach similar to that of equation (2)) to attain the initial estimate and then use the iterative formula of equation (7) to refine this initial estimate until the error has been reduced to a minimal level, whereupon the calculated adjustment is applied to the hardware system; if the resultant performance is still unsatisfactory then the procedure may be repeated for a second physical alignment pass.

FIG. 9 is a flow chart associated with such a combined algorithm to which a few additional refinements have been added.

The start of the algorithm is at block 900, wherein the initial performance measurements $I(\vec{A})$ are made. Thereupon, control passes to block 910 wherein an arbitrarily small hardware adjustment $\vec{\delta A}$ (which may have only one nonzero component $\delta A_k$ if $\partial^2 I/\partial A_k \partial A_j$ is nonzero for all j) is applied and a second performance measurement $I(\vec{A}+\vec{\delta A})$ is made. In block 920 an initial estimate $A^1$ is calculated, by solving equation (8) with a best fit least squares approach. This initial estimate is then refined if possible by rescaling using different multipliers until a best fit is obtained between the measured performance $I(\vec{A})$ and the calculated performance of a software model of the corresponding a priori design that has had its performance degraded by a corresponding offset adjustment.

In block 940, further refinements to the estimated error A are made in accordance with the iterative technique discussed above with respect to equation (7) until convergence has been obtained. In that regard, it is to be noted that by using the simultaneous approach of equations (7) and (7') and/or by using a software model to determine an optimal scaling factor T, a fast convergence to a good estimate $A^n$ may be enhanced, as indicated in block 940 by the text in parentheses.

In any event, the estimated aberration is then used as the basis for making a corresponding physical adjustment (possibly employing the damping technique discussed previously with respect to block 808 of FIG. 8). A new performance measurement is then made in block 960 which if not satisfactory (flow line 962) then causes a second pass through the algorithm starting with block 920 (assuming that the adjustment made in block 950 satisfies the criteria for $\delta A$ in equation (8), otherwise it will be necessary to make another arbitrarily small hardware adjustment in accordance with block 910). Once a satisfactory performance has been obtained, then the algorithm is terminated in block 970.

Figure 10:
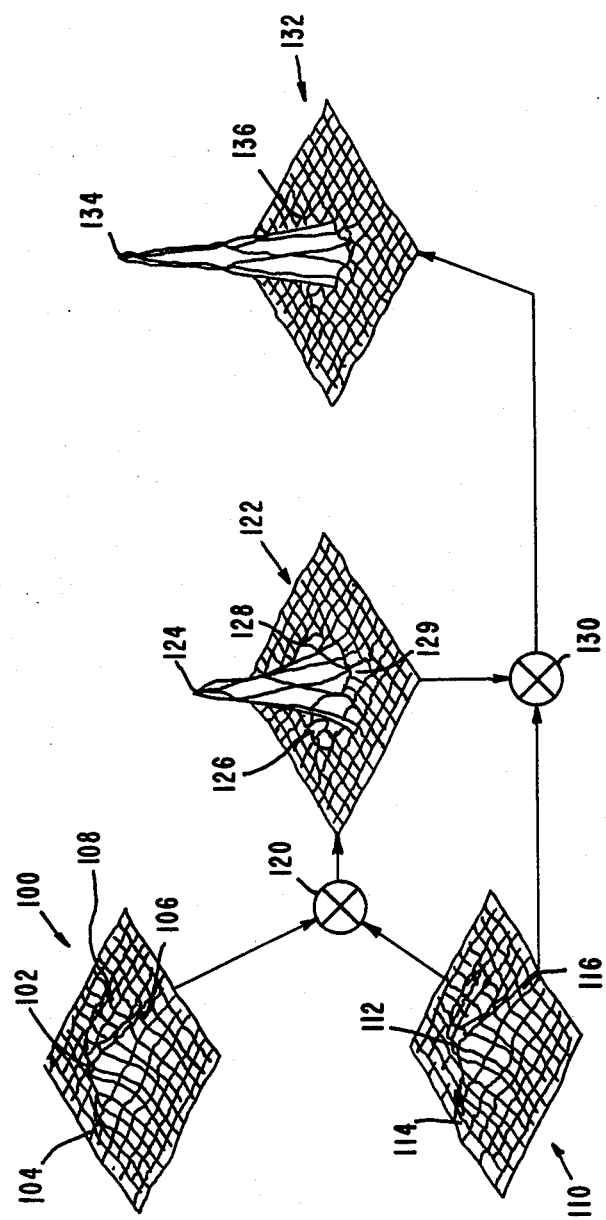
FIG. 10 depicts the intensity function of a point source image as a two dimensional curve at various stages during the application of the alignment method of FIG. 9.

Referring now specifically to FIG. 10, which it will be recalled represents the intensity function I as a two-dimensional curve, it will be observed in particular that after only two passes of the alignment method of FIG. 9, a significantly aberrated image of a point source has been transformed into an almost perfect image thereof.

The starting condition is indicated by two-dimensional curve 100 which is the graph of the intensity function associated with an aberrated system whose initial aberrated state may be indicated symbolically as $\vec{A}$. It will be noted that the image has a very slight peak at point 102 but is generally astigmatic, extending almost linearly from point 104 to point 106. Furthermore, there is a certain degree of flare or coma aberration associated with this image as indicated by the slight branch visible at 108. Graph 110 depicts the intensity function associated with the same point source image after an infinitesimal adjustment to the system $\delta A$ has been made. It will be noted that graph 110 is substantially similar to graph 100 and a represents a highly astigmatic image having a relatively low peak 112 and a principal astigmatic axis passing from point 114 to point 116 with some coma being visible at point 118.

The Strehl ratio associated with graphs 100 and 110 is only 18%, the Strehl ratio being defined as the ratio of the light intensity in the central area of the image as compared to the theoretically possible maximum (i.e., a perfectly aligned system limited only be defraction effects). The "X" within a circle symbol 120 indicates that the second order alignment technique discussed previously with respect to FIG. 9 has been utilized to calculate an initial estimate of the alignment error by means of the second order difference technique of equation (8) to generate an initial estimate of the aberration $\vec{A^1}$ which then is refined first by a vector search technique (i.e., an optimal scaling factor) followed by further refinement in accordance with the iterative technique of equation (7) until no significant further refinement appears feasible, whereupon the resultant estimated aberration $\vec{A^n}$ is used to physically adjust the real world system and a new set of intensity function measurements for the thus-adjusted system $I(\vec{A}-\vec{A^n})$ is made. It may be seen that graph 122 has a fairly sharp peak 124 closely surrounded by three regions of much less intensity (indicated by reference numeral 126, 128 and 129) which appear to be residual effects of the original aberrations clearly visible in graph 100 at points 104, 106 and 108 respectively. The Strehl ratio for the point source image associated with graph 122 has been increased to 62%.

These much improved intensity measurements (graph 122) are then combined with the corresponding intensity measurements prior to the last adjustment (graph 110) and the method of FIG. 9 is repeated a second time (symbol 130), to result in the intensity function graph 132 of a point source image after two alignment passes. It will be noted that the resultant image is now almost perfect, having a high sharp peak 134 surrounded by a slight first order diffraction ring 136. The Strehl ratio is 97%.

Although the invention has been described in detail with particular reference to one or more particular embodiments thereof, it will be obvious to the skilled artisan that many obvious modifications and variations may be made to such embodiments without departing from the true scope and nature of the invention.

What is claimed is:

1. A method for realigning a complex optical system having several degrees of alignment freedom comprising the steps of:
   (a) measuring a plurality of optical performance characteristics, said plurality of characteristics having at least as many separate components as the number of said alignment degrees of freedom;
   (b) determining whether or not the alignment of the system is satisfactory by comparing a figure of merit derived from said plurality of performance components with a pre-established performance criterion;
   (c) if the said performance is determined not to be adequate, then,
      (i) calculating successive approximations to an estimated set of adjustments that would alter the calculated performance of an analytical model of said system to a degraded performance comparable to said measured performance;

(ii) deriving a set of physical adjustments for said adjustment parameters from said estimated set of adjustments so as to compensate at least partially for the alignment errors associated with said system; and (iii) applying said physical adjustments to the optical system for correcting any alignment errors;

(iv) repeating steps (a) through (c) (iv) until a satisfactory alignment results.

2. An improved optical system having a realignment capability comprising:

an optical system having a number of individual optical units with complementary optical characteristics and spatial relationships to each other positioned on an optical axis extending from an object to an image side, at least a plurality of optical units being movably mounted relative to the optical axis and having an interactive effect on the image transmitting ability of image side optical units;

means for moving the movably mounted optical units to change their respective spatial positions;

means for providing signals indicative of an analytical optical model of an optimized optical system capable of providing the predetermined optical performance desired by the optical system;

means for measuring a plurality of predetermined characteristics indicative of the optical performance of the optical system and producing corresponding measurement signals;

means for comparing the measurement signals with the signals indicative of the analytical model and providing adjustment signals necessary to conform the optical performance of the analytical model to that of the measured optical system, and means for applying the adjustment signals to the means for moving the optical units to realign the spatial position of the optical units for conformance toward the predetermined optical performance of the analytical optical model.

3. The invention of claim 2 wherein the means for measuring includes a Hartmann mask insertable into the optical system to quantify characteristics indicative of the optical performance.

4. The invention of claim 2 wherein the means for measuring includes an image detector array positioned at the focal plane of the optical system to provide measurement signals.

5. The invention of claim 4 wherein the Hartmann mask is positioned on the object side of the image detector array within the optical system.

6. The invention of claim 2 wherein the means for comparing the measurement signals includes a linear approximation processing of the measurement signals to provide adjustment signals.

7. The invention of claim 6 wherein the means for comparing further includes means for providing a simultaneous approximation of the adjustment signals by solving a set of stored predetermined equations expressing each of the predetermined characteristics as a linear function of the spatial relationships of the optical units.

8. The invention of claim 7 wherein the simultaneous solution is a least squares best fit solution.

9. The invention of claim 8 wherein the simultaneous solution is a damped least squares solution wherein different weighting factors are stored and are associated with each optical relationship.

10. The invention of claim 2 wherein the means for applying the signals include a plurality of micrometers, whereby some of the micrometers are attached to a single optical unit for movement of the optical unit along and about the optical axis to provide three translational degrees of freedom.

11. The invention of claim 2 wherein the means for applying the adjustment signals includes a plurality of micrometers connected to an optical unit for movement to compensate for thermal changes in the radius of curvature of optical units in the optical system.

12. The invention of claim 2 wherein the means for measuring includes means for introducing a reference device for providing wavefront slope measurements at different subpupils.

13. The invention of claim 2 wherein the means for measuring includes a device for measuring optical performance characteristics at three different positions in the optical system field of view.

14. An improved optical system having an automatic realignment capability comprising:

an optical system having a number of individual optical units with complementary optical characteristics and spatial relationships to each other positioned on an optical axis extending from an object to an image side, at least a plurality of optical units being movably mounted relative to the optical axis and having an interactive effect on the image transmitting ability of image side optical units;

means for moving the movably mounted optical units to change their respective spatial positions;

means for providing signals indicative of an analytical optical model of an optimized optical system capable of providing the predetermined optical performance desired by the optical system;

means for measuring a plurality of predetermined characteristics indicative of the optical performance of the optical system and producing corresponding measurement signals including a multiapertured member removably mounted on the optical axis for quantifying aberrations in the wavefront from an image source and an image detector positioned at the focal plane of the optical system on the image side of the apertured member;

computer means for comparing the measurement signals with the signals indicative of the analytical model and providing adjustment signals necessary to conform the optical performance of the analytical model to that of the measured optical system, and means for automatically applying the adjustment signals to the means for moving the optical units to realign the spatial position of the optical units for conformance with the predetermined optical performance of the analytical optical model.

15. The invention of claim 14 wherein said means for measuring comprises a Hartmann mask at an interior stop plane of the optical system for quantifying aberrations in a wavefront from an image source, as shifts in the centroid of an output image at the focal plane.

16. The invention of claim 14 wherein the means for comparing the measurement signals includes a linear approximation processing of the measurement signals to provide adjustment signals.

17. The invention of claim 16 wherein the means for comparing further includes means for providing a simultaneous approximation of the adjustment signals by solving a set of stored predetermined equations expressing each of the predetermined characteristics as a linear function of the spatial relationships of the optical units.

18. The invention of claim 17 wherein the simultaneous solution is a least squares best fit solution.

19. The invention of claim 18 further including means for storing a set of predetermined weighting factors associated with each optical relationship.

20. The invention of claim 19 wherein the simultaneous solution is a damped least squares solution wherein different weighting factors are associated with each optical relationship.

21. The invention of claim 14 wherein the means for applying the signals include a plurality of micrometers, whereby some of the micrometers are attached to a single optical unit for movement of the optical unit along and about the optical axis to provide three translational degrees of freedom.

22. The invention of claim 14 wherein the means for applying the adjustment signals includes a plurality of micrometers connected to an optical unit, for movement, to compensate for thermal changes in the radius of curvature of optical units in the optical system.

23. The invention of claim 14 further including means for providing an infinity point source in the optical system as a reference for measurement of the optical characteristics.

24. The invention of claim 23 wherein the means for providing an infinity point source includes a laser source to generate a laser beam and reflective means for introducing the laser beam into the optical system.

25. A method of aligning an optical system comprising the steps of;

providing an optical system having a number of individual optical units with complementarily optical characteristics and spatial relationships to each other positioned on an optical axis extending from an object to an image side, at least a plurality of optical units being movably mounted relative to the optical axis and having an interactive effect on the image transmitting ability of image side optical units;

providing signals indicative of an analytical optical model of an optimized optical system capable of providing the predetermined optical performance desired by the optical system;

measuring a plurality of predetermined characteristic indicative of the optical performance of the optical system and producing corresponding measurement signals;

comparing the measurement signals with the signals indicative of the analytical model and providing adjustment signals necessary to conform the optical performance of the analytical model to that of the measured optical system, and automatically moving the optical units in response to the measurement signals to align the spatial position of the optical units for conformance toward the predetermined optical performance of the analytical optical model.

26. The invention of claim 25 further comprising providing a reference image source and measuring the predetermined optical characteristics with a Hartmann mask at an interior stop plane of the optical system for quantifying aberrations, in a wavefront from the image source as shifted in the centroid of an output image at the focal plane.

27. The invention of claim 25 wherein the comparison of the measurement signals includes a linear approximation processing the measurement signals to provide adjustment signals.

28. The invention of claim 25 wherein the comparison of measurement signals includes storing a set of predetermined equations expressing each of the predetermined characteristics as a linear function of the spatial relationships of the optical units and solving the equations with the measurement signals to provide a simultaneous approximation of the adjustment signals.

29. The invention of claim 28 wherein the simultaneous solution is a least squares best fit solution.

30. The invention of claim 29, wherein the simultaneous solution is a damped least squares solution wherein different weighting factors are stored and are associated with each optical relationship.

* * * * *